United States Patent [19]

Little

[11] Patent Number: 4,548,308
[45] Date of Patent: Oct. 22, 1985

[54] FRICTION CLUTCH DRIVEN PLATE

[75] Inventor: John B. Little, Coventry, England

[73] Assignee: Automotive Products plc, Leamington Spa, England

[21] Appl. No.: 441,212

[22] Filed: Nov. 12, 1982

[30] Foreign Application Priority Data

Nov. 14, 1981 [GB] United Kingdom ............... 8134380

[51] Int. Cl.⁴ .............................................. F16D 3/66
[52] U.S. Cl. ................................. 192/106.2; 464/68
[58] Field of Search ....................... 192/106.2; 464/68

[56] References Cited

U.S. PATENT DOCUMENTS

| 2,745,268 | 5/1956 | Reed | 192/106.2 X |
| 3,327,820 | 6/1967 | Maurice | 192/106.2 X |
| 4,036,341 | 7/1977 | Beeskow et al. | 192/106.2 |
| 4,122,931 | 10/1978 | Maucher | 192/106.2 |
| 4,406,357 | 9/1983 | Nagano et al. | 192/106.2 |
| 4,440,283 | 4/1984 | Nioloux | 192/106.2 |

FOREIGN PATENT DOCUMENTS

| 1501465 | 10/1967 | France . | |
| 2040398 | 8/1980 | United Kingdom . | |
| 2044397 | 10/1980 | United Kingdom . | |
| 2044396 | 10/1980 | United Kingdom . | |
| 2050567 | 1/1981 | United Kingdom . | |
| 2050568 | 1/1981 | United Kingdom . | |
| 2056019 | 3/1981 | United Kingdom | 192/106.1 |

Primary Examiner—Rodney H. Bonck
Attorney, Agent, or Firm—Kemon & Estabrook

[57] ABSTRACT

A friction clutch driven plate comprises a hub having a fixed hub flange and an auxiliary hub flange which can rotate a limited amount relative to the hub. Bob weights can move radially under centrifugal force against return springs to engage apertures in the auxiliary hub flange and lock the hub flanges together. This reduces the effective length of spring windows in the hub flanges and the range of movement permitted by a low rate spring which damps gearbox rattle when in neutral.

2 Claims, 5 Drawing Figures

FRICTION CLUTCH DRIVEN PLATE

This invention relates to friction clutch driven plates and particularly but not exclusively for driven plates for automobile friction clutches.

In friction clutch driven plates it is common practice for the friction facings to be mounted on a hub for relative rotation with the hub, springs operating between the hub and the facing carrier to resist such rotation. Further in French Patent 1 501 465 it is known to provide the driven plate with low rate torsion damping springs to damp out low load oscillations to eliminate gearbox rattle when in neutral, and stiffer springs for damping out drive load oscillations.

A disadvantage of this type of driven plate is that when a vehicle is "on-drive" i.e. the driver has his foot on the accelerator, and then the accelerator is released, the torque transmission between the friction facing and the hub suddenly changes direction i.e. it is reversed and the driven plate goes into overrun. This causes knocking because the low torque springs for damping out the gearbox rattle cannot cope with the sudden change in direction of high torque loads and the clutch centre knocks as it comes to a temporary halt against the high strength springs. Therefore, there is a conflict between the requirements for low torque springs to damp out gearbox rattle and the minimising of free relative rotation when the torque changes from "on-drive" to overrun.

In British Patent Applications 2 044 396 and 2 044 397 there are described locking mechanisms responsive to centrifugal force and which prevent operation of the low rate torsion damping springs during overrun conditions above a predetermined speed of rotation of the driven plate. Hence the low rate springs function during idling, but not during general driving of the vehicle. In the locking mechanisms shown in both the above applications the abutment means is provided by a complicated arrangement of springs and levers. This complication leads to high cost and poor durability.

The present invention seeks to provide an alternative construction of a driven plate which prevents operation of low rate springs during overrun conditions but which has a simpler construction than the above-mentioned prior art driven plates.

According to the present invention there is provided a friction clutch driven plate comprising a hub having a fixed hub flange fast therewith, a friction facing carrier plate mounted on the hub for limited rotation relative to the hub, the friction facing carrier plate having spring windows which co-operate with spring windows in the fixed hub flange and with damping springs to resist said rotation, wherein an auxiliary hub flange having spring windows co-operates with said damping springs and a centrifugally operable spring returnable locking means to prevent rotation of the auxiliary hub flange relative to the hub when the driven plate is rotating above a predetermined speed, some of the windows in the auxiliary hub flange being shorter than the corresponding windows in the fixed hub flange.

Conveniently the locking means comprises a bob weight constrained for radial movement in one of said hub flanges and co-operating with an aperture in the other of said hub flanges, in which case the bob weight may be movable in a radially elongated aperture in said one hub flange and the aperture in said other hub flange is substantially T shaped having a radially extending portion and a circumferentially extending portion, the locking means being operative when the radially extending portion is aligned with the aperture in said one hub flange.

The invention will be described by way of example and with reference to the accompanying drawings in which.

Figure 1:
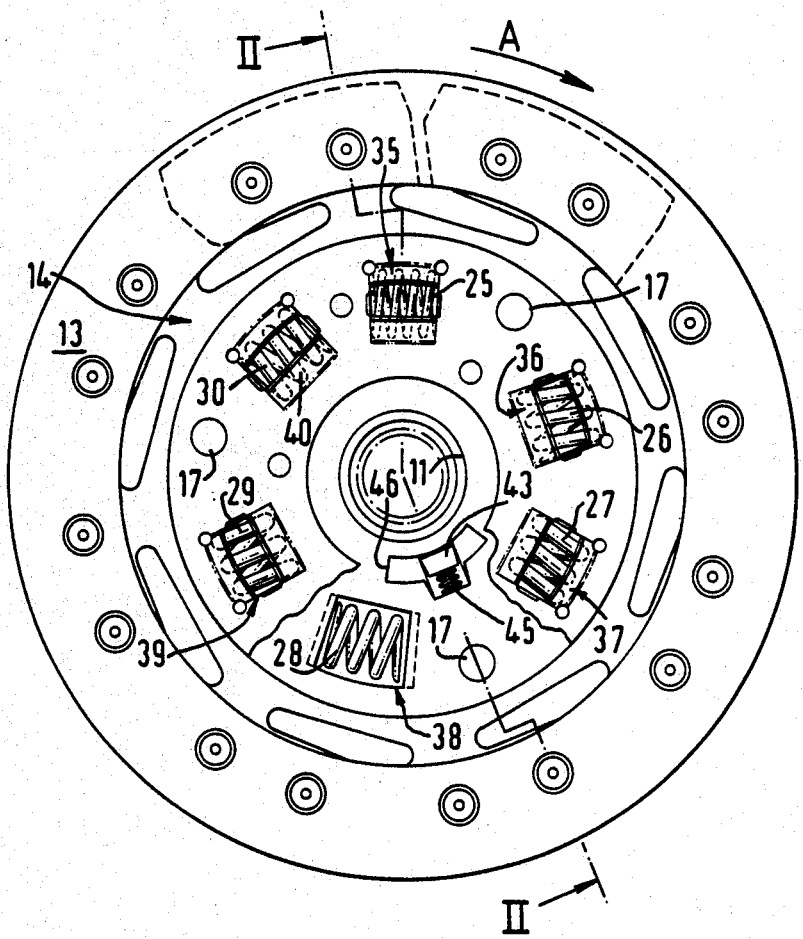
FIG. 1 is an elevation of a clutch driven plate according to this invention partially cut away to show the annular plate and locking means.
Figure 2:
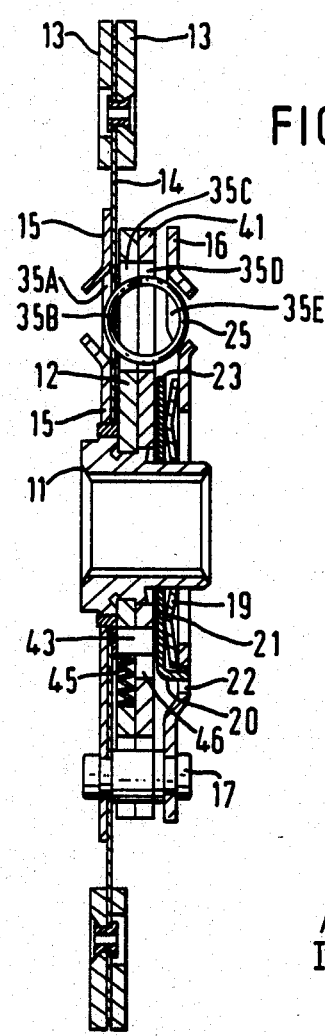
FIG. 2 is a section on the line II—II of FIG. 1.

Referring to FIG. 1 to 4 of the accompanying drawings, a friction clutch driven plate for a vehicle clutch comprises a hub 11 having a fixed hub flange 12 made fast therewith by interengaging splines and a known method of peening. A pair of friction facings 13 are mounted on a facing carrier plate 14 that extends radially inwards towards the hub 11 and is located on one side of the fixed hub flange 12. The carrier plate 14 is supported on its side away from flange 12 by a support plate 15, being secured to the support plate 15 by three stop pins 17 each of which passes axially through a respective circumferentially elongated aperture 18 in the outer peripheral margin of flange 12. A retainer plate 16 is located on the other side of the carrier plate 14 and is secured by the stop pins 17. The carrier plate 14, support plate 15 and retainer plate 16 are rotatable relative to the hub 11, such rotation being limited by abutment of the stop pins 17 with the radial edges of the respective apertures 18.

An auxiliary hub flange 41 is located on the hub 11 between the fixed hub flange 12 and the retainer plate 16 and is rotatable relative to the hub 11. The outer peripheral margin of the auxiliary flange 41 has circumferentially elongated apertures 48 therein to accommodate the stop pins 17. A friction washer 21 is located on the side of the auxiliary flange 41 away from the fixed flange 12. A spring washer 19 acts between the retainer plate 16 and an axially movable washer 23 to load the friction washer 21 against auxiliary hub flange 41 and also bias the auxiliary hub flange 41 against the fixed hub flange 12. The axially movable washer 23 is prevented from rotation relative to the hub 11 by a tongue 20 which co-operates with a notch 22 in the retainer plate 16.

The rotational movement of the friction facing carrier plate 14 relative to the hub 11 is resisted by six damping springs 25, 26, 27, 28, 29 and 30 each located in respective aligned sets of spring windows 35, 36, 37, 38, 39 and 40 respectively in the carrier plate 14, support plate 15, fixed hub flange 12, auxiliary hub flange 41 and retainer plate 16. To identify a particular window in a set, those in the support plate 14 will be given a suffix A, those in the carrier plate 15 a suffix B, those in the fixed hub flange 12 a suffix C, those in the auxiliary hub flange 41 a suffix D and those in the retainer plate 16 a suffix E. One spring 25 has a relatively low rate for damping out gearbox rattle and is a snug fit in its respective set of windows 35, so that any rotational movement between the facing carrier and hub 11 causes the low rate spring 25 to be compressed. The other five springs 26, 27, 28, 29 and 30, are main damping springs for damping out oscillations in the drive load and are a snug fit in their respective support plate, carrier plate and retainer plate 36A, 36B, 36E; 37A, 37B, 37E; 38A, 38B, 38E; 39A, 39B, 39E; 40A, 40B, 40E but have some end clearance in their respective fixed hub flange windows 36C, 37C, 38C, 39C, and 40C such that the friction facing carrier plate 14 can rotate about the hub 11 in either direction for a predetermined amount before any one of the main damping springs comes into operation. In this particular case three springs 26, 28 and 30 are of medium rate and are each arranged to have the same end clearance in their respective fixed hub flange windows 36C, 38C and 39C and come into operation before the other two springs 27 and 29, each of which has the same, larger, clearance in their respective two fixed hub flange windows 37C and 39C. These other two springs 27 and 29 are of relatively high rate.

Figure 4:
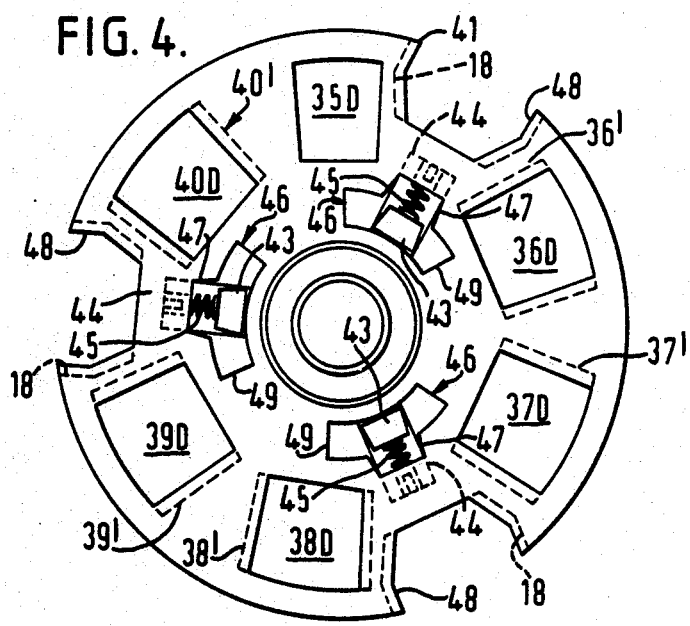
FIG. 4 is an elevation of the annular plate of FIG. 2 also showing in dotted outline the positions of the corresponding hub flange spring windows.

The spring windows 35D, 36D, 37D, 38D, 39D and 40D in the auxiliary hub flange 41 are arranged so that the low rate spring 25 is a snug fit in its associated window 35D, as previously stated, whilst the other windows 36D–40D are each shorter than their respective co-operating fixed hub flange windows 36C–40C (see FIG. 4). The length of each auxiliary hub flange window 36D–40D is shorter by the same amount as compared with the length of the fixed hub windows 36C–40C. Similarly, the stop pin apertures 48 in the auxiliary hub flange 41 are shorter than the stop pin apertures 18 in the fixed hub flange 12.

A spring returnable locking means for preventing rotation of the auxiliary hub flange 41 relative to the hub 11 when the driven plate is rotating above a predetermined speed comprises three bob weights 43. Each bob weight is constrained for radial movement by a respective one of three radially elongated apertures 44 in the fixed hub flange 12 and is biased to the radially inner end of its respective aperture 44 by a respective return spring 45. The auxiliary hub flange 41 has three 'T' shaped apertures 46 therein each having a radially extending portion 47 that aligns with apertures 44 in the hub, and a circumferentially extending portion 49 at the radially inner end of the radial portion 47. The sides of the radially extending portion 47 of each aperture converge slightly in the radially outward direction and the abutting flanks of the bob weights 43 are correspondingly tapered. The operation of the driven plate will now be described with further reference to FIG. 5. When the hub 11 is held stationary and a rotational load is applied to the friction facings 13, the driven plate operates as follows:

(i) During conditions the driven plate is rotating at a low rate of revolutions, i.e. below 900 revolutions per minute and the friction facings 13 are subject to a drive load to move the facing carrier clockwise (in the direction of arrow 'A') relative to the hub 11 the following sequence of events take place:

(a) The facing carrier plate 14 rotates clockwise against the load in the low rate spring 25 and the auxiliary hub flange 41 is held stationary relative to the fixed hub flange 12 by the friction between their abutting faces induced by the load of the spring washer 19. This continues until the medium rate springs 26, 28 and 30 abut the ends of their respective auxiliary hub flange windows 36D, 38D and 40D. The auxiliary hub flange 41 then moves with the facing carrier plate 14 until these springs 26, 28 and 30 abut the ends of their respective fixed hub flange windows 36C, 38C and 40C. This is the part X of curve 1. The rotational movement of the auxiliary hub flange 41 relative to the fixed hub flange 12 is accommodated by the circumferentially extending portions 49 of the apertures 46 which allow for the relative circumferential displacement of the bob weights 43.

(b) Further clockwise movement of the facing carrier plate 14 is against the loads in the low and medium rate springs 25, 26, 28 and 30 and this will continue until the high rate springs 27 and 29 abut the ends of their respective fixed hub flange windows 37C and 39C. The auxiliary hub flange 41 will move with the facing carrier plate 14 until the high rate springs 27 and 29 have reached this position. This is the portion Y of the curve I.

(c) Further clockwise movement of the facing carrier plate 14 is against the loads in all the damping springs 25, 26, 27, 28, 29 and 30. Since the ends of the springs are held against their respective fixed hub spring windows 35C, 36C, 37C, 38C, 39C and 40C, the auxiliary hub flange 41 will now be stationary relative to the fixed hub flange 12. This portion of movement will continue until the stop pins 17 each abuts the radial ends of their respective fixed hub flange apertures 18 and is represented by the part Z of the curve I.

If the load on the friction facings is now reduced the reverse sequence of events takes place until the driven plate returns to the zero position.

If an overrun load is applied to the friction facings, the facing carrier plate 14 moves anti-clockwise relative to the hub 11. The same sequence of events take place as previously described in paragraphs (a), (b) and (c) to give the complete curve I—I.

(ii) During conditions when the driven plate is rotating at above 950 revolutions per minute, the bob weights 43 will each be moved radially outwards by centrifugal force against the bias of its return spring 45 and into the radially extending portion 47 of the respective apertures 46 in the auxiliary hub flange 41 so as to lock the auxiliary flange 41 rotationally fast with the fixed flange 12. When the auxiliary hub flange 41 is locked relative to the fixed hub flange 12, the spring windows 35D–40D are in alignment with the fixed hub flange windows 35C–40C and therefore the operation of the damping springs 25–30 is dictated by the respective spring windows in 35D–40D in the auxiliary hub flange 41.

As previously described, the windows 35C and 35D in the hub flanges 12 and 41 are of the same length, whilst the other auxiliary hub flange windows 36D–40D are shorter than the corresponding fixed hub flange windows 36C–40C.

This has the effect of reducing the amount of relative rotation that takes place between the facing carrier and the hub before the medium and high rate springs 26, 27, 28, 29 and 30 come into operation. If the drive load is now applied to the friction facing carrier plate 14 as previously described in paragraphs (a), (b) and (c) above, the same sequence of events take place except that the medium rate springs 26, 28 and 30, and then the high rate springs 27 and 29, come into operation sooner.

Also, the total rotational movement is reduced by the abutment of the stop pins 17 against the radial ends of the apertures 48 in the auxiliary hub flange 41.

Figure 5:
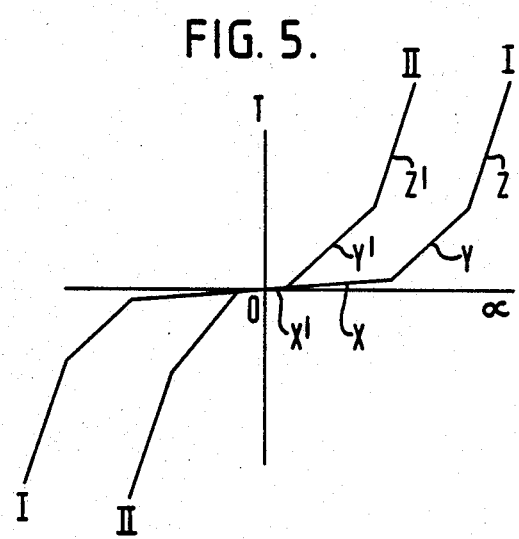
FIG. 5 is a graph of torsional load T versus angular deflection for a driven plate of the type illustrated in FIG. 1.
Figure 3:
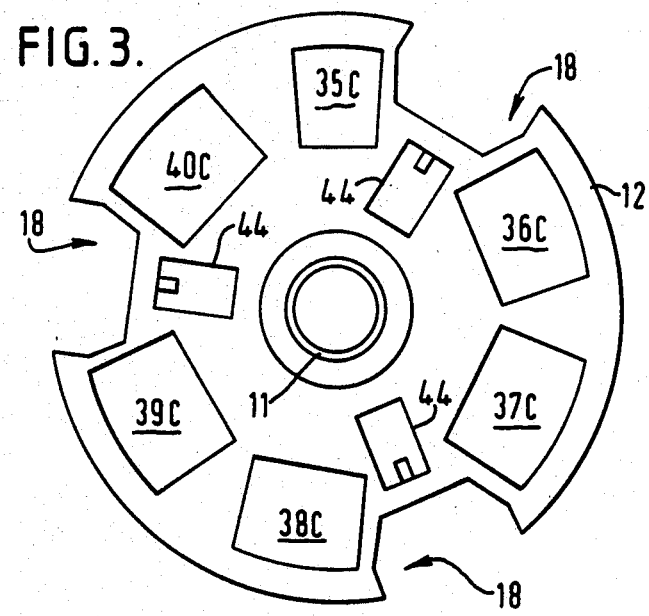
FIG. 3 is an elevation of the hub and hub flange of FIG. 1.

Operation of the driven plate when the hub flanges 12 and 41 are locked is represented by the curve II—II of FIG. 5. The driving portions Y' and Z' of the curve II—II correspond almost exactly to the portions Y and Z of curve I—I but the portion X' when the low rate spring 25 acts alone, has been reduced compared to portion X of curve I—I. This means that when the drive load is reversed and the plate becomes subject to an overrun load, there is very little backlash due to operation of the low rate spring 25 alone.

The centrifugally controlled locking device between the auxiliary hub flange 41 and hub 11 becomes inoperative again when the rotation of the driven plate drops to about 850 revolutions per minute and the bob weights 43 are moved radially inwards by the return springs 45 so as to be aligned with the circumferentially extending portions 49 of the apertures 46 in the auxiliary hub flange 41. The convergent sides of the aperture portions 47 and the tapered flanks of the bob weights help to prevent any tendency for the bob weights to remain locked in the aperture portions 47 due to friction.

Although the full angular range of operation of the driven plate has been described for conditions when the centrifugally controlled locking device is inoperative, it will be appreciated that under normal conditions there will be no appreciable drive torque on the driven plate below 950 revolutions per minute so that normally only portion X (and its corresponding reverse torque portion) of curve I—I would be applicable.

The apertures 44 and 46 in the fixed hub flange 12 and auxiliary hub flange 41 may be transposed.

The frictional engagement of the hub flanges 12 and 41 prevents unnecessary shuffling movement between these components when the gearbox is in neutral and thus keeps wear of the bob weights 43 to a minimum. Further friction is provided by the friction washer 21 between the auxiliary hub flange 16 and plate 23. However, the hysteresis caused by this friction is not shown in FIG. 5 for reasons of clarity.

I claim:
1. A friction clutch driven plate comprising:
   a hub;
   a fixed hub flange fast with the hub;
   a friction facing carrier plate mounted on the hub for rotation relative to the hub;
   an auxiliary hub flange mounted on the hub for rotation relative to the hub;
   stop means for limiting the angle of relative rotation between the carrier and said flanges;
   a plurality of sets of co-operating spring windows in the fixed hub flange, the friction facing carrier plate and the auxiliary hub flange, at least some of the windows in the auxilary hub flange being shorter than the corresponding windows in the fixed hub flange;
   a plurality of damping springs, each of which is accommodated in a corresponding set of said spring windows;
   and locking means for preventing rotation of the auxiliary hub flange relative to the hub when the driven plate is rotating above a predetermined speed, said locking means comprising a radial slot in one of said flanges, a centrifugally operable spring returnable bob weight constrained for radial movement in said radial slot, and a substantially T shaped aperture in said other flange into which said bob weight extends, said aperture having a circumferentially extending inner portion allowing relative angular movement between said flanges at low rotational speeds of the driven plate and a radially outwardly extending portion into which said bob weight can be urged at higher speeds by centrifugal force to lock said flanges against relative rotation.
2. The driven plate of claim 1, wherein the hub flanges are spring biassed into frictional engagement with each other.

* * * * *